Nov. 8, 1960  J. E. LINDBERG, JR  2,959,732
ENGINE ANALYZER EMPLOYING RADIO-FREQUENCY OSCILLATIONS
Filed Oct. 5, 1954  6 Sheets-Sheet 1

INVENTOR.
JOHN E. LINDBERG, JR.
BY
ATTORNEY.

Fig. 2.

INVENTOR.
JOHN E. LINDBERG, JR.
ATTORNEY

Nov. 8, 1960  J. E. LINDBERG, JR  2,959,732
ENGINE ANALYZER EMPLOYING RADIO-FREQUENCY OSCILLATIONS
Filed Oct. 5, 1954  6 Sheets-Sheet 3

INVENTOR.
JOHN E. LINDBERG, JR.
BY
ATTORNEY

Nov. 8, 1960 J. E. LINDBERG, JR 2,959,732
ENGINE ANALYZER EMPLOYING RADIO-FREQUENCY OSCILLATIONS
Filed Oct. 5, 1954 6 Sheets-Sheet 4

INVENTOR.
JOHN E. LINDBERG, JR
BY
ATTORNEY

Nov. 8, 1960  J. E. LINDBERG, JR  2,959,732
ENGINE ANALYZER EMPLOYING RADIO-FREQUENCY OSCILLATIONS
Filed Oct. 5, 1954  6 Sheets-Sheet 6

INVENTOR.
JOHN E. LINDBERG, JR.
BY
ATTORNEY.

United States Patent Office 2,959,732
Patented Nov. 8, 1960

2,959,732

ENGINE ANALYZER EMPLOYING RADIO-FREQUENCY OSCILLATIONS

John E. Lindberg, Jr., 953 Hawthorne Drive, Lafayette, Calif.

Filed Oct. 5, 1954, Ser. No. 460,305

24 Claims. (Cl. 324—16)

This invention relates to an engine analyzer and particularly to a system for analyzing the performance in and adjacent to the combustion chamber of an internal combustion engine by studying radio-frequency oscillation initiated therein. This application is a continuation-in-part of my application Serial Number 426,444, filed April 29, 1954, and now abandoned.

By the term "engine analyzer" I refer particularly, though not exclusively, to the type of engine analyzer shown by Patents 2,518,427 of August 8, 1950, to John E. Lindberg, Jr. et al., and Patent 2,570,252 of October 9, 1951, to John E. Lindberg, Jr. As in these patented analyzers, my new analyzer is adapted to use a cathode ray oscilloscope to plot the primary magneto voltage, or the like, of an engine as the ordinate of a graph; the timing degrees of the engine are preferably used as the abscissa of the same graph. The preferred way of maintaining accuracy in an analysis is to synchronize the abscissa of the graph at all times with the actual rotational position of the engine crankshaft as by means of a trip-action sweep generating circuit controlled to initiate its sweep selectively at any point in the engine cycle. All this structure is described in Patent 2,518,427. In addition, other types of engine analyzers may be used with the present invention, if desired.

The present invention makes it possible to identify conditions inside the engine cylinder which could not be properly identified by previous analyzers. The engine power analyzer shown in Patent 2,518,427 was a great advance in the analysis of engines, but identical effects at the oscilloscope could be produced by widely disparate causative conditions in the combustion chamber. For example, in a twin-ignition cylinder the ignition diagrams of the analyzer may indicate that both spark plugs are shorted, a "shorted secondary" pattern appearing simultaneously on both plugs. But this pattern may be the result of any one of three vastly different conditions:

(1) Both spark plugs may have been peened over so that their electrodes are in direct contact with each other.

(2) There may be a loss of compression due to a leaking or stuck valve.

(3) There may be an advanced stage of pre-ignition.

Particularly in aircraft in flight, it is very important for the pilot or flight engineer to know which one of these conditions is occurring, because his subsequent activity should depend on which one it is, and the proper action will vary greatly. The action that may cure one of these conditions might cause extreme danger in another condition. This can be seen clearly from examining each one of these three conditions separately.

(1) When both spark plugs have become peened over, it is almost always because there is a loose part in the cylinder, i.e., a piece of broken piston ring, a broken piece of piston land, a broken valve head, or some foreign part which has entered the cylinder through the induction system. If the engine is permitted to run under these conditions, the damage will continually increase and will normally develop to the point of a complete failure of the entire engine. This may result in sudden stoppage of the engine, and the rotation of the engine-propeller combination may then cause complete severance of the power plant from the aircraft and result in damage to the remaining structure. It also creates a potential fire hazard. Alternately, if the propeller is feathered and the engine stopped as soon as the structural failure is detected and before any damage has occurred outside the combustion chamber of that one cylinder, then no further damage will be done, and at the next airport all that need be done is to replace the single cylinder. So the proper remedy during flight is to *stop* the engine by feathering the propeller, thereby reducing the aircraft drag to a minimum and leaving the engine available for temporary emergency use, if necessary.

(2) If the combined left and right shorted secondary pattern is caused merely by a sticking valve, then the pilot or flight engineer should *not stop* the engine but should endeavor to free the stuck valve by changing the fuel-air ratio, the manifold pressure, the r.p.m., or the engine cowl flap setting, to change the engine temperature. This often succeeds, and then the pilot has the complete use of that engine. Even if the valve cannot be unstuck, still the engine can be operated safely, as engine roughness will not normally be excessive, and a stuck valve in one cylinder of a multi-cylinder engine will not greatly reduce the power efficiency of the engine. Thus, if the pilot *knows* that the only trouble is a stuck valve—and *knows* that it is not a mechanical failure—he should not stop the engine, and there is no need at the next landing point to disassemble the engine, for flight or ground maintenance procedures can normally correct the trouble. Stopping the engine in this instance could increase the danger rather than cure it. Yet the patterns shown by a prior-art engine analyzer could not differentiate between this condition and mechanical failure.

(3) The same shorted secondary pattern on both plugs may also be caused by an advanced condition of pre-ignition. Pre-ignition can cause a rise in temperature to a point where the stresses in the cylinder exceed the strength of the parts at those elevated temperatures, and then the piston may be burned or the cylinder cracked, or other similar damage occur. Pre-ignition results from a hot spot which causes premature ignition of the fuel-air mixture prior to the normal ignition through the spark plugs. Fully advanced pre-ignition results from a hot spot whose temperature has advanced as the pre-ignition advanced. The way to correct pre-ignition is to change the operating conditions in the engine to lower the temperature of this hot spot below the self-ignition temperature. This may be done by use of one or more of the following: (a) injecting additional fuel, water, or other coolant into the combustion chambers; (b) lowering the engine manifold pressure; (c) changing the engine r.p.m.; or (d) increasing the air-speed or cowl flap setting to cool the engine. The proper time to apply these remedial measures is as soon as the trouble is discovered, rather than cutting out the engine and waiting until landing.

Heretofore no engine ignition analyzer has been able to differentiate between these three conditions. Yet, knowledge as to the differences between 1, 2 and 3 are of tremendous importance to safe and economical operation. In the case of items 2 and 3, proper procedures can restore the engine to full operational use in flight without any further maintenance being required. However, the procedures that would unstick a valve may be exactly the wrong thing to do to eliminate pre-ignition, and they would certainly be the wrong thing to do if there was mechanical failure already within the engine.

The present invention has solved this problem, and my new analyzer cannot only detect instantly the presence of any one of these three conditions, but can identify positively which one of the three it is.

In addition to solving the above-described problems, my new analyzer gives data that is helpful in determining the proper engine combustion mixtures, this data being unobtainable from former types of analyzers. My invention shows whether the fuel-air mixture is too lean or too rich and makes it possible to see clearly on the cathode-ray screen when the maximum power ratio of fuel to air has been reached.

Still another problem solved by the present invention is the detection and analysis of detonation in a cylinder.

My new engine analyzer for the first time makes use of radio frequency (R-F) oscillations occurring in the engine, as well as the audio frequency (A-F) oscillations which prior art analyzers used exclusively. By a combination of these two types of oscillations, the patterns appearing on the oscilloscope will provide a solution to all the problems described above.

Analyzers heretofore in use did not and could not use R-F oscillations. In fact, prior to this invention it was not known that the engine ignition circuit produced any R-F oscillations which could be used. It will be worth while to examine briefly the reason for this condition of the prior art.

When the high voltage in a magneto secondary coil discharges, a spark jumps across the spark-plug gap and ignites the fuel in the cylinder. Each spark actually consists of one peak discharge, after which a series of small oscillations occur until the voltage becomes too low to maintain the discharge. The direction of an induced current depends on the direction of the flux change which produces it, and, therefore, the sparks produced by the magneto are of alternate polarity; that is, the spark jumps first in one direction and then in the other. Basically, the magneto is a form of alternating current generator, modified to enable it to provide the high voltage necessary for ignition purposes. It is demonstrable that a very broad spectrum of frequencies is produced by the discharge of high tension energy across a spark plug gap, and that this ranges all the way from frequencies within the audio range (A-F) to very high radio-frequencies (R-F) well up in the megacycle band. However, practical use, operation-wise, of these higher frequencies associated with ignition phenomena has been impossible because of their dissipation in other portions of the ignition circuit and in the coupling between the ignition circuit and the analyzer circuit.

As part of the primary circuit of a magneto, a condenser is connected across the breaker points in order to adsorb the surge that occurs when the current flow is suddenly stopped and to minimize arcing at the distributor points with its resultant pitting and burning. Heretofore, most of the radio frequency current passed through this condenser to ground and was not thereafter present in the ignition circuit. Since the condenser is a necessary piece of apparatus in the more widely used aircraft engine ignition circuits, and since engine analyzers have been designed for use with the engine ignition circuit rather than vice versa, it was assumed that there was no significant amount of R-F voltage available in the engine analyzer circuit and heretofore no effort was even made to detect it.

In addition to the loss through the magneto condenser, there were other places where the small remaining R-F oscillations were lost, one of these being the primary coil itself and another being the resistor normally interposed between the analyzer circuit and the ignition circuit. This resistor was used to prevent a grounding of the analyzer circuit (i.e., the cathode ray oscilloscope) from stopping the engine. I have discovered that this resistor can be replaced by a condenser which will not only prevent the danger which the resistor was designed to avoid, but will also pass the radio-frequency oscillations.

In the present invention I have devised means for detecting the R-F oscillations initiated in the secondary circuit, and for analyzing their presence or absence, and if present, their pattern so as to indicate the presence or absence or state of the conditions described above.

Of the factors contributing to modulation of the magneto's energy, as it passes across the spark plug gap, the rapidly varying resistances at this gap are the most potent. Other modulating factors exist in the ignition circuit but usually are far less effective than the spark gap. The resistance of a gap is effectively the product of the physical dimension of the electrode spacing and the gaseous pressure enveloping the electrodes. When this gaseous pressure normally present at the spark plug in a normally operating cylinder is reduced, as for example, in a badly leaking valve, the total resistance of the gap may be likewise reduced so that this gap will no longer modulate ignition energy in the A-F frequency range. Thus, on the screen of a prior-art analyzer, such a condition will appear as a shorted circuit condition. No means are available in the prior-art analyzer to allow differentiation between a low pressure cylinder and one in which a mechanical short circuit exists because of peened-together electrodes. However, it is demonstrable that R-F oscillations are produced by energy discharge across a gap, *as long as* the *gap exists* regardless of the atmospheric pressure at the gap. Thus, by providing means by which the presence or absence of such R-F oscillations may be detected on an analyzer, my invention makes possible the accurate determination of the presence of a gap in the spark plug versus the destruction of the gap through mechanical failure in the engine.

Other objects and advantages of the invention will appear from the following description presented in accordance with 35 U.S.C. 112.

In the drawings:

Fig. 7 shows three oscillograms.

Figure 1:
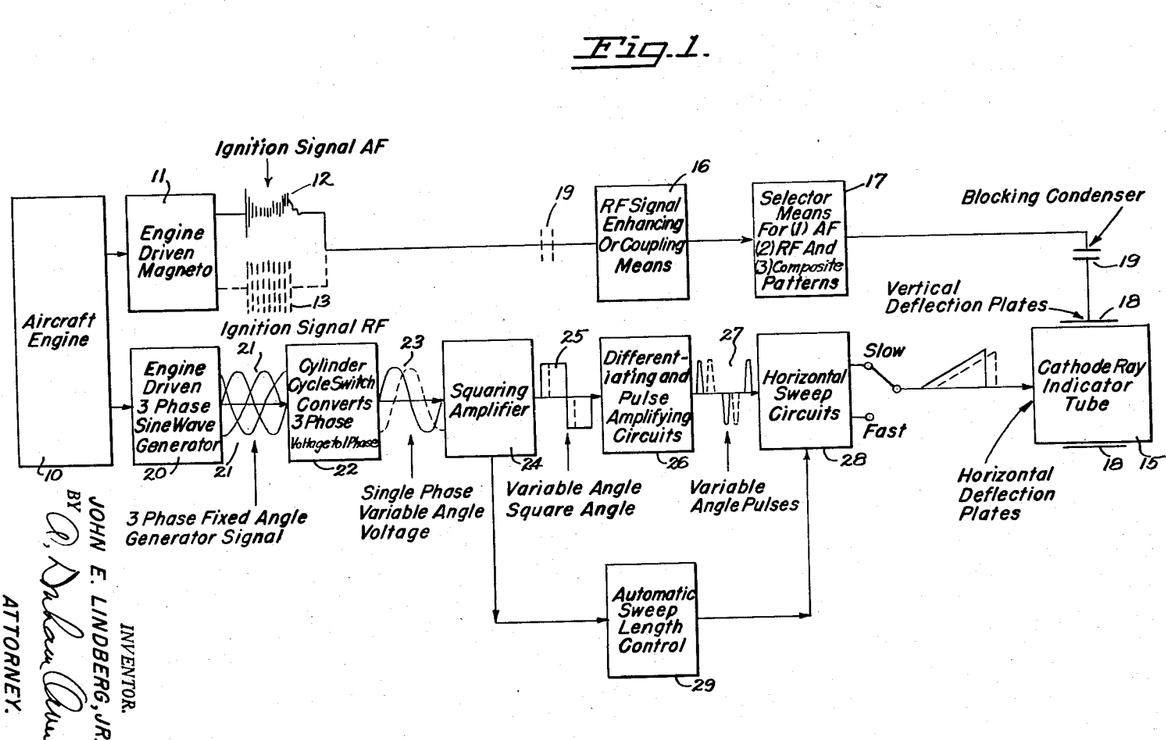
Fig. 1 is a simplified block diagram of one preferred form of an aircraft engine analyzer embodying my new invention.

Basic analyzer circuit
(Fig. 1)

Fig. 1 is a simplified block diagram of an engine analyzer system embodying my invention, but not restrictive thereof. The upper line shows the development of the ignition signals and the lower line the development of one type of sweep voltage, though other sweep means may be used.

An aircraft engine 10 includes an engine power supply such as an engine-driven magneto 11 which sends forth an ignition signal made up of an audio-frequency component 12 and a radio-frequency component 13, which actually occur simultaneously and superimposed, but are separable. Heretofore, only the A-F component 12 was detectable or even known to exist. For the purposes of this specification and claims, the term "audio-frequency" means those frequencies lying in the range up to about 15 kc., and anything above that 15 kc. level is considered to be a "radio-frequency" oscillation.

In my invention the R-F signal 13 is made available at the oscilloscope 15 by an enhancing means 16. A selector switch 17 is also used to place on the oscilloscope 15 either the A-F alone, the R-F alone, or both simultaneously. Other selector switches and apparatus as in Patent 2,518,427 may be used, and this signal voltage is applied eventually to the vertical deflection plates 18 of the cathode-ray indicator tube or oscilloscope 15. In addition, a blocking condenser 19 is employed at some location between the magneto 11 and the oscilloscope 15 to prevent accidental grounding of the tube 15 from stopping the engine 10. It may be in either the location shown in solid lines or the one shown in dotted lines.

The sweep circuit may be obtained as shown in the block diagram or by other known means used in such analyzers. In the circuit shown in Fig. 1, for purposes of illustration, an engine-driven three-phase sine-wave generator 20 emits a three-phase, fixed angle generator signal 21. The signal 21 passes through a cylinder cycle switch 22, well known in the art, which converts the three-phase voltage 21 to a single-phase variable-angle voltage 23. The signal 23 may then go to a squaring amplifier 24 also well known in the art, producing a variable-angle square wave 25. By passing this voltage 25 through differentiating-and-pulse-amplifying circuits 26, variable angle pulses 27 may be produced. These pulses 27 may then be used in the horizontal sweep circuit 28 of the cathode-ray tube 15. An automatic sweep length control 29 may be inserted between the squaring amplifier 24 and the sweep circuits. These features are old in the art but will give a basis for understanding the operation of an engine analyzer system.

The operation of the sweep circuit shown herein is, briefly, as follows:

As the synchronizing generator 20 revolves once during a full engine cycle (two revolutions of the crankshaft) the angular position of its rotor at a given instant, indicates electrically the angular position of the crankshaft through 720°. Its 3-phase output 21 is converted into a single phase voltage 23 by the cycle switch 22 which, by its position shifts the phase of this voltage to initiate the horizontal trace line before each selected engine event occurs.

The voltage 23 from the cycle switch 22 is amplified and then enters the squaring stages 24 of the amplifier, followed by the differentiating and amplifying circuit 26 that converts the square wave 25 into positive and negative pulses 27. The positive pulses trigger the horizontal sweep 28 across the cathode ray tube 15 once for each cycle of the engine 10. By shifting the cycle switch 22, the pulses 27 can be shifted in either direction to cause the sweep initiation to occur just prior to a selected event in any cylinder.

These positive pulses also trigger a saw-tooth voltage which controls the rate of the horizontal sweep across the cathode ray tube 15. A push-pull knob (not shown) on the cycle switch 22 may have two positions: "pushed in" for fast sweep and "pulled out" for slow sweep. Fast sweep may show approximately 68° of crankshaft rotation, while slow sweep may show 720° of crankshaft rotation.

What happens in the analyzer as a whole is that the ignition signals 12 and 13 are used on the vertical plates 18 of the cathode ray tube 15, and the sweep circuits are used on the horizontal plates 28. In this manner, the vertical distance (ordinate) indicates the amplitude of the R-F or A-F voltage or both, in the ignition circuit, while the spacing of the lines along the abscissa indicates the frequency of the voltage being observed, and the position of each signal along the length of the abscissa or sweep circuit indicates the relationship of the signal to the engine cycle. Typical diagrams of the fast-sweep type are shown in Figs. 7–13 and will be explained later on.

Several coupling or R-F enhancing means 16 are possible, and several of these novel hookups are shown in the circuits of Figs. 2–5, which will now be described in detail. Several selector switch means 17 are also possible, some of which are shown. The unexpected new results obtained by this novel structure will be explained still further on, after the structure and operation of the device are made apparent.

Figure 2:
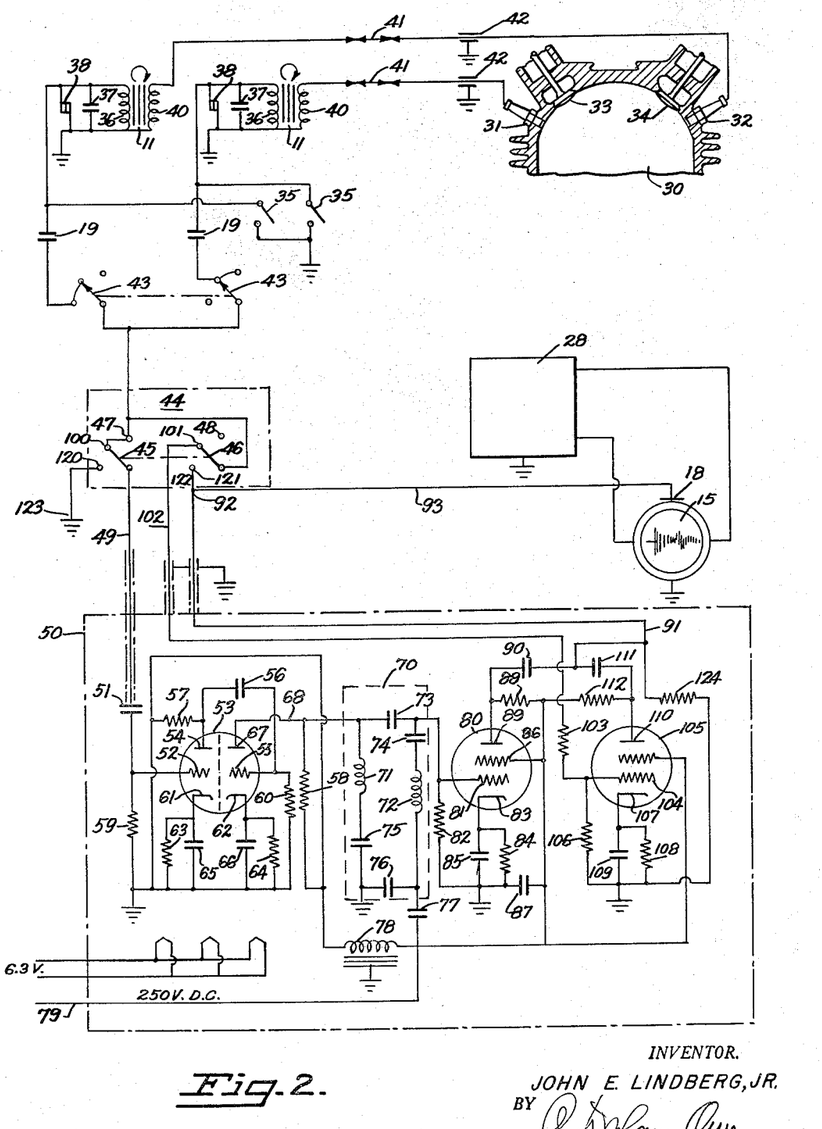
Fig. 2 is a more detailed circuit diagram of one form of the ignition circuit and vertical deflection part of the analyzer circuit, embodying the principles of my invention. In this form of the invention, a radio-frequency amplifier is used to detect and tune the radio-frequency oscillations remaining in the primary ignition circuit and show them on the oscilloscope.

Analyzer with radio frequency amplifier
(Fig. 2)

Fig. 2 shows a more detailed circuit diagram of one form of my new system. For purposes of description it will be assumed that we are to analyze the performance of an internal combustion engine cylinder 30 having twin ignition provided by spark plugs 31 and 32. The cylinder 30 has valves 33 and 34, shown diagrammatically, and in addition has a piston (not shown) and other parts normally appearing in this type of engine 10.

In this invention use is made of the ignition circuit which operates the spark plugs 31 and 32 and is generated by the magnetos 11. With each magneto switch 35 open and its magnet rotating, the primary coil 36 has one end grounded and is connected in parallel with the primary condenser 37 (also having one side grounded) and with the breaker points 38 (also with one side grounded). The secondary coil 40 is connected through the distributor 41 to the spark plug 31. A duplicate circuit is used for the spark plug 32. Between the distributor 41 and its spark plug 31 or 32 there is a secondary circuit capacitance represented at 42, which together with the presence of the secondary coil 40 and the spark at 31 or 32 initiates radio frequencies, in addition to the audio frequencies which are generated in the ignition circuit.

In parallel with this ignition circuit is an engine analyzer cathode-ray oscilloscope 15 which may be provided with a sweep circuit 28 as described above and may be substantially identical to the device shown in Patent 2,518,427. However, the present invention is not confined to use with the analyzer of that patent and may be used with other analyzers and other types of sweep circuits. Between the oscilloscope 15 and each ignition circuit is the blocking condenser 19 which serves to prevent any grounding of the analyzer circuit from stopping the engine, while permitting the R-F oscillations as well as the A-F oscillations to pass from the ignition circuit to the analyzer. This condenser 19 is new in this invention, for previously a resistor has been used as the safety device, and it blocked out substantially all the useful R-F.

A three-way switch 43 is provided as a condition selector switch, similar to switch 40 in Patent No. 2,518,427, to connect either or both magnetos 11, which fire the two separate spark plugs 31, 32 of a given cylinder 30, with the oscilloscope 15.

The signals that pass through the switch 43 go to a double pole triple-throw switch 44 whose poles 45 and 46 are joined in tandem and, according to their position send to the oscilloscope 15 either the R-F signal alone, the A-F signal alone, or both together as a composite signal.

When the poles 45 and 46 are in contact with their respective terminals 47 and 48 the R-F signal alone will appear on the oscilloscope 15. The pole 46 is then in engagement with the terminal 48 which leads nowhere; therefore its circuit is broken. At the same time the pole 45 conducts the composite signal from the terminal 47 to the lead 49 and into the amplifier 50.

Inside the amplifier 50 the lead 49 is connected through the coupling condenser 51 to the grid 52 of the first vacuum tube 53. The vacuum tube 53 is a conventional resistance-capacitance coupled amplifier in which all the components of the ignition signal are amplified without particular discrimination; however, the values employed in the networks tend to limit gain largely to the signal components within the R-F spectrum.

It will be noted that the tube 53 has two complete amplifying systems. The plate 54 of the first half is coupled to the grid 55 of the second half through the condenser 56. The tube 53 is provided with the normal plate load resistors 57 and 58, grid leak resistors 59 and 60, and the cathodes 61, 62 are biased to ground by resistors 63 and 64, and by-pass condensers 65 and 66.

From the second plate 67 a lead 68 passes the amplified signal into a lattice-type filter 70. The lattice filter 70 comprises a pair of inductances 71 and 72 and four condensers 73, 74, 75, 76. Through this filter the undesirable audio-frequencies are eliminated so that the signal output from the filter 70 lies in the desired range of radio frequencies. For a circuit having the values given in the table below, this frequency range will be about 50–95 kilocycles.

It will be noted that the plate supply of 250 volts D.C. enters between a condenser 77 and an inductance 78, the condenser 77 providing current isolation between the filter 70 and the power supply 79, while the inductance 78 decouples the plates of the tube 53 from the plates of the other tubes 80 and 105 and prevents any feedback modulation from passing through the tube 53 via the power supply 79.

Since the lattice filter 70 not only discriminates against the unwanted A-F components but also reduces much of the R-F gain that is acquired in the tube 53 a further stage of R-F amplification is provided in the tube 80. The condenser 73 provides the coupling between the tubes 53 and 80 and, together with the condenser 74 provide isolation, as well as being part of the lattice filter 70. The signal from the filter 70 is sent into the tube 80 through the grid 81, which has its grid leak 82. As usual, the cathode 83 has its biasing resistor 84 and by-pass condenser 85, and the screen grid 86 is provided with a by-pass condenser 87 to ground. A plate load resistor 88 is also provided between the plate 89 and the screen grid 86, in the circuit leading to the power source 79.

The amplified R-F output from the tube 80 leads from the plate 89 through the coupling condenser 90 to the lead 91 and passes from there through the junction 92 and lead 93 directly to the ungrounded vertical deflection plate 18 of the oscilloscope 15. Thus the R-F signal alone is amplified when the poles 45 and 46 are thrown against the terminals 47 and 48.

To obtain a composite picture of both the R-F and A-F frequencies on the oscilloscope 15, the poles 45 and 46 are thrown against terminals 100 and 101. The current from the terminal 100 passes through the pole 45 and follows the same route of R-F amplification as did the signal obtained when the pole 45 was closed against the terminal 47. Therefore, the R-F signal is again amplified and the A-F signal eliminated from this portion of the circuit. However, simultaneously, the same composite signal passes across the pole 46 to the terminal 101. This portion of the circuit sends the signal through the lead 102 via the resistor 103 into the grid 104 of the four-element vacuum tube 105. This tube 105 has a grid leak resistor 106; its cathode 107 has a bias resistor 108 and a large by-pass condenser 109 that prevents R-F activity in this stage. The gain in the tube 105 is limited to an output level approximating an uninterfered-with signal.

The tube 105 serves as a medium to *electrically* isolate the output of the tube 80 from the ignition system. At the same time it serves to mix the audio frequency components of the ignition signal with the amplified radio frequency components derived from the tube 80. Without such a mixing device as the tube 105 the entire frequency characteristic of the system would be drastically altered, each time the magneto system is short-circuited—i.e., as it is in each cycle when the breaker points 38 are closed—because a series of large and very effective circuit components (i.e., resistance, capacitance, and inductance elements) are removed from the amplifier input system during this short circuit. Oscillation would then be set up as a result of the feedback loop formed via grounding the top side of the magneto system. If this oscillation were once established, it would continue at the expense of the signals which were intended to be read. However, with the vacuum tube mixing valve 105, the amplified output from the tube 80 is kept isolated from these circuit changes, and no such problem is encountered; so it is simple to provide the necessary electrical isolation which prevents this auto-oscillation.

The plate 110 of the tube 105 is therefore connected via a condenser 111 to the lead 91 and therefore the audio frequency, amplified somewhat, passes along with the more highly amplified R-F signal from the plate 89 of the tube 80 to the vertical deflection plates of the oscilloscope 15 and will therefore produce a composite signal containing both the R-F and A-F components of the engine ignition signal. At the same time the condensers 111 and 90 isolate the tubes 80 and 105. A plate load resistance 112 is also provided between the plate 110 and the power supply 79.

The third position of the double pole switch 44 results when the pole 45 is against the terminal 120 and the pole 46 is against the terminal 121. In this instance the audio-frequency component is passed directly from the terminal 121 through the lead 122, the junction 92 and the lead 93 and to the vertical deflection plates 18 of the oscilloscope 15. No R-F current is passed to the oscilloscope 15 because the ignition signal does not pass across the pole 45, and instead the amplifier 50 input side is grounded at 123.

Due to possible charges building up on either of the condensers 90 or 111 and therefore loading the vertical deflection plates 18 on the oscilloscope 15, a resistor 124 is inserted at the junction of these condensers 90 and 111 to bleed off any such accumulation to ground.

Thus, the function of the circuit is twofold:

(1) It discriminates for and amplifies ignition signal components falling in the "R-F" spectrum, between about 95–100 kc.

(2) It permits mixing the signals so amplified with the ignition signal components falling in the A-F spectrum (approx. 15 kc. and lower) which are those usually seen on the standard engine analyzer, and to do this without distortion resulting to either set of signals so mixed.

While other types of amplifiers 50 may be used, the one just described has given very satisfactory results. Where the R-F band desired is approximately in the range of 50–95 kilocycles the following are circuit values of the elements of the amplifier 50:

TYPICAL CIRCUIT VALUES FOR THE AMPLIFIER 50

| Component | Units | Value |
|---|---|---|
| Condenser 51 | microfarads | .01 |
| Condenser 56 | do | .01 |
| Resistor 57 | ohms | 33,000 |
| Resistor 58 | do | 75,000 |
| Resistor 59 | do | 100,000 |
| Resistor 60 | do | 100,000 |
| Resistor 63 | do | 620 |
| Resistor 64 | do | 25,000 |
| Condenser 65 | microfarads | .02 |
| Condenser 66 | do | .02 |
| Inductance 71 | millihenries | 150 |
| Inductance 72 | do | 150 |
| Condenser 73 | microfarads | .0002 |
| Condenser 74 | do | .0002 |
| Condenser 75 | do | .0002 |
| Condenser 76 | do | .0002 |
| Condenser 77 | do | .01 |
| Inductance 78 | millihenries | 30 |
| Resistor 82 | ohms | 100,000 |
| Resistor 84 | do | 1,000 |
| Condenser 85 | microfarads | .1 |
| Condenser 87 | do | .01 |
| Resistor 88 | ohms | 10,000 |
| Condenser 90 | microfarads | .01 |
| Resistor 103 | ohms | 41,000 |
| Resistor 106 | do | 16,000 |
| Resistors 108 | do | 1,000 |
| Condenser 109 | microfarads | 25 |
| Condenser 111 | do | .01 |
| Resistor 112 | ohms | 10,000 |
| Resistor 124 | do | 100,000 |

TUBES USED SUCCESSFULLY

| | |
|---|---|
| Tube 53 | 2C51 |
| Tube 80 | 6AQ5 |
| Tube 105 | 6AQ5 |

Any R-F voltage from 15 kc. up may be similarly amplified. For example, the amplifier 50 may be tuned to the 58–60 kc. range, where that is the range of radio frequencies most prevalent in the secondary spark plug circuit of a particular ignition system, or it may be tuned to 85 or 86 kc., or any other R-F. Actually any broadband radio frequency amplifier is entirely satisfactory, though for any specific case, one particular frequency range may give optimum results.

Thus the R-F voltage and the A-F voltage from the spark plugs 31 and 32 pass through their ignition circuits. The R-F is much more easily lost than the A-F, due to the presence of the grounded primary condenser 37 and the grounded primary coil 36 as well as by stray circuit losses. The R-F, therefore, was not heretofore available at the oscilloscope end of the circuits; in fact, nobody knew it was available there or that it would be useful in analysis. Since this R-F was not observable, its use had not even been contemplated, but I have found that by using the blocking condenser 19 in place of a protective resistor (as heretofore used in analyzers) and by using the R-F amplifier 50, great use can be made of these R-F oscillations. This use is discussed in later sections, after describing other circuits making the R-F oscillation available for use.

Figure 3:
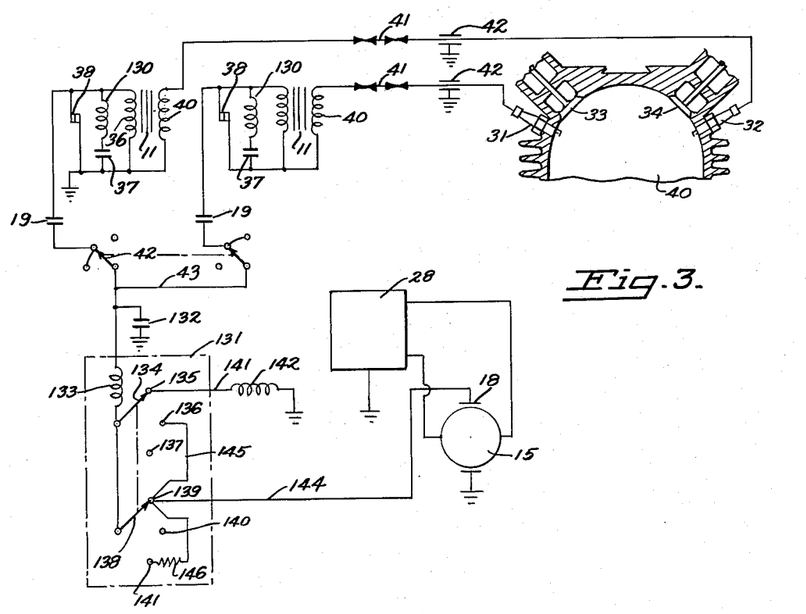
Fig. 3 is a circuit diagram of a modified form of the invention, in which a low-resistance, radio-frequency choke coil is used in series with the primary condenser of a magneto.

*Analyzer with a radio-frequency choke coil in series with the primary condenser*

(Fig. 3)

Fig. 3 shows a modified form of circuit diagram employing my new invention to obtain the R-F oscillations from the ignition circuit. In most cases, the same elements are shown as in Fig. 2, with identical reference numerals. However, no R-F amplifier 50 is needed in this circuit, though one may be used if desired. Instead a low-resistance R-F coil 130 is placed in series with the primary condenser 37 on either the grounded or ungrounded side. In this manner, the primary source of dissipation of the R-F oscillations is blocked, and the R-F oscillations do not pass out of the circuit but are available at great strength in the analyzer circuit. Normal magneto operation at characteristic frequencies is not affected. The operation is basically the same as that of the Fig. 2 device except that instead of amplifying a *very* weak R-F signal, a very much stronger signal is obtained by preventing its dissipation through the primary condenser 37.

An alternative form of switch 131 is shown in connection with this circuit. This switch 131, like the switch 44, is a double-pole triple-throw switch adapted to place on the oscilloscope 15 the pattern from either the R-F signal or the A-F signal or both. It will be noted that the line has grounded stray capacitance 132; in order to balance this a choke coil 133 is provided in between the switch 43 and the switch 131.

In the switch 131, the pole 134 is adapted to contact any one of three terminals 135, 136, and 137, while the pole 138 is adapted to contact terminals 139, 140, 141. The poles 134 and 138 are linked together mechanically and electrically, and in the position shown in the drawing, the pole 134 is in contact with the terminal 135 while the pole 138 is in contact with the terminal 139. A lead 141 from the terminal 135 leads the signal to a filter choke 142 which bleeds off the audio-frequency current to ground but does not pass the radio-frequency current. The radio-frequency signal therefore goes through pole 138 to the terminal 139 and through the lead 144 to the oscilloscope 15, thus reproducing thereon the radio-frequency pattern only.

When the pole 138 contacts the dead-end terminal 140, the pole 134 is in contact with the terminal 136 and current is then sent through the lead 145 to the lead 144 and thence to the oscilloscope 15. Since there is no filter in the circuit at this time, a composite signal of both radio and audio-frequency signals is obtained on the oscilloscope 15.

When the pole 134 is in contact with the dead-end terminal 137, the pole 138 is in contact with the terminal 141 which leads through an R-F attenuator 146 to the lead 144 and thence to the oscilloscope 15, producing thereon the audio frequency signal only.

Figure 4:
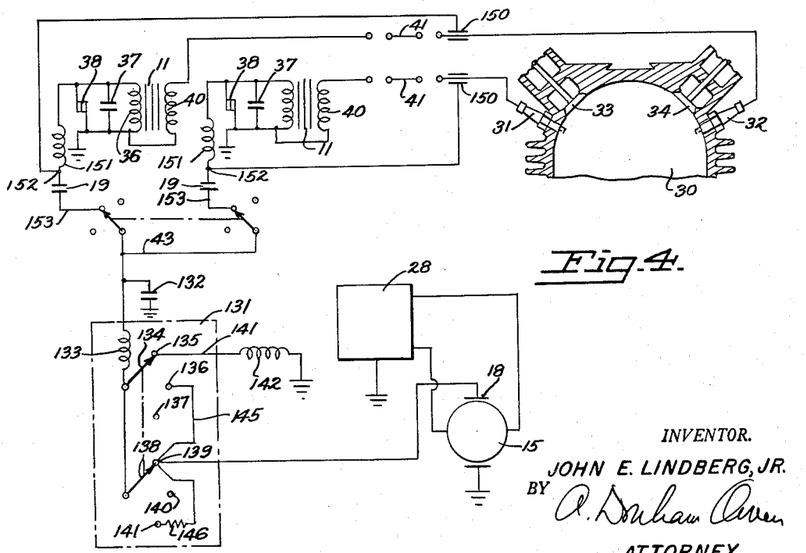
Fig. 4 is a circuit diagram showing another modified form of the invention, using a capacitance coupling between the analyzer circuit and the secondary circuit of the engine ignition system.

*Analyzer with capacitance pickup at secondary circuit*

(Fig. 4)

Fig. 4 shows another modified form of circuit. Most of the circuit elements are the same as in Fig. 3. However, instead of using the R-F coil 130 the R-F signals are enhanced by providing a capacitance-type pickup 150 at the secondary circuit between the distributor 41 and the spark plug 31 or 32. In addition to this capacitance pickup 150, a low-resistance R-F coil 151 is provided between the juncture of the pickup circuit lead 152 with the analyzer lead 153 and the primary condenser 37, to prevent leakage of the R-F through the condenser 37. This circuit operates in generally the same manner as the circuits of Figs. 2 and 3 but has some advantages and some disadvantages not possessed by those circuits. The principal disadvantage is the relative difficulty of installation on present equipment, in that a capacitance coupling 150 is required for every spark plug, and the fact is, that often these secondary circuits are difficult to get at to make the installation. However, it can be done and, as will now be shown, there are certain advantages in doing so.

R-F oscillations are generated at the distributor gaps, in addition to the R-F oscillations generated at the spark plug gap. When either the circuit of Fig. 2 or of Fig. 3 is used the R-F generated at the distributor gap is in the same circuit with and is superimposed on the spark-plug R-F. Also the distributor gap attenuates the spark plug generated R-F in a variable manner as the distributor arm rotates and this changes the length of the distributor gap. For some purposes this distributor-generated R-F obscures the reading of the R-F oscillations in the combustion chamber. The capacitance coupling 150 as shown in Fig. 4 eliminates this distributor-generated R-F and distributor gap attenuation of the spark plug gap R-F makes possible such analysis as that of combustion mixtures. This type of analysis cannot as readily be made by the circuits shown in Figs. 2 and 3 for the R-F shown on the oscilloscope 15 in those circuits remains substantially uniform over the normal combustion cycle because of the above factors. But the circuit of Fig. 4, showing only the spark plug R-F, enables the more accurate determination of the leanness of the fuel-air mixture by noting the position where R-F current first appears on the diagram. This will be described in more detail later on.

Figure 5:
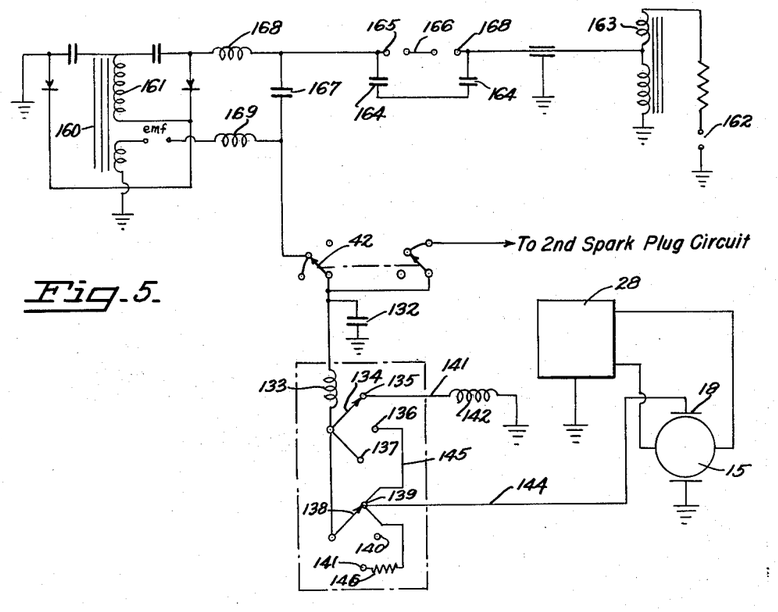
Fig. 5 is a circuit diagram of another modified form of the invention using a capacitance pick-up from the secondary side of a high-frequency engine ignition circuit.

*Analyzer for "high frequency" ignition system engine*

(Fig. 5)

The modified form of capacitance-type coupling shown in Fig. 5 has been designed particularly to go with high frequency ignition systems. In these systems the secondary 161 of the magneto 160 is a relatively low voltage coil and the high voltage necessary for the spark plug 162 is obtained by a minute transformer 163 incorporated inside the spark plug 162. In this instance, a low impedance coil 164 or a condenser of about .03 microfarad or smaller is placed around or connected to each point 165 of the distributor 166 to bypass the spark-plug R-F past that point, in a manner similar to Fig. 4. The R-F is bridged across the magneto 160 by a condenser 167 and two low resistance R-F choke coils 168, 169 are used, one interposed between the condenser 167 and each side of the magneto 160. If desired, a booster may also be used. The transmitter in this instance will normally be tuned to a relatively high frequency, e.g., 1.6 megacycles.

Figure 6:
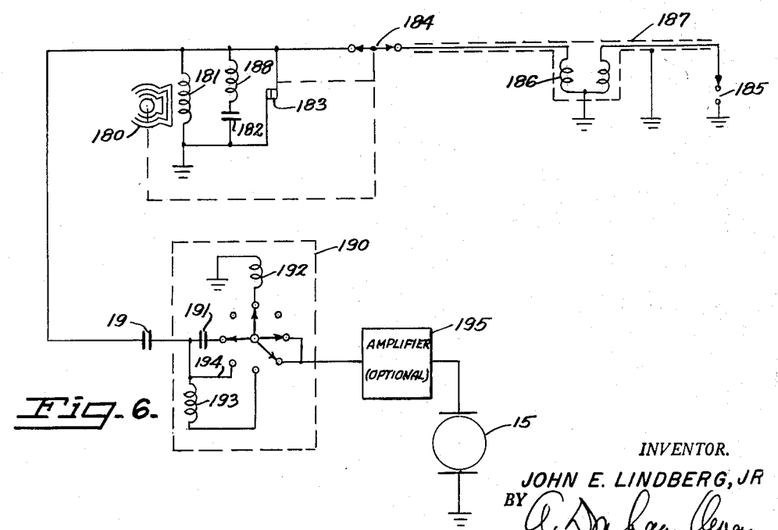
Fig. 6 is a circuit diagram of another modified form of the invention, in some ways similar to the circuit of Fig. 3, but modified to operate with a low-tension magneto.

*Analyzer for "low tension" ignition system engine*

(Fig. 6)

The analyzer shown in Fig. 6 is somewhat similar to that shown in Fig. 3 except that it is designed to accommodate a low tension ignition system in which the magneto 180 has no secondary coil. It has a primary coil 181, primary condenser 182, breaker points 183, and a distributor 184. The voltage for the spark plug 185 is boosted at a transformer 186 between the distributor 184 and spark plug 185. As shown in the drawings, the distributed capacity 187 in the circuit between the distributor 184 and the spark 185 is grounded. The primary coil 181, the primary condenser 182 and the breaker points 183 are also grounded. In practicing the present invention, a very small choke coil 188 is placed in series with the primary condenser 182. Preferably, this choke will have an inductance of about 1.5 microhenries or less, and a resistance of only about 1.5 micro-ohms. The above circuit, is connected through the standard isolating condenser 19, preferably having a capacity of about .05 microfarad or larger, to a three-way switch 190, which as a matter of illustration is in a somewhat different form from those switches shown earlier. When eliminating the A-F current so that only the R-F current passes to the oscilloscope 15, the current is passed through an A-F impedance condenser 191 of .03 microfarad or smaller. A choke 192 of approximately the same values as the choke 188 is located between the switch 190 and ground to prevent the R-F current from being ground. When eliminating the R-F current so that A-F current only reaches the oscilloscope 15, the signal is passed through a choke 193 of approximately the same value as the chokes 188 and 192. Thereby only the A-F current passes. When passing both R-F and A-F signals to obtain the composite diagram on the oscilloscope, the current is passed through the lead 194 which avoids both the condenser 191 and choke 193. The resultant signal may or may not be amplified (as at the optional amplifier 195) particularly as to its R-F component, before it appears on its oscilloscope screen.

Thus the R-F generated at the spark 185 is prevented from being grounded by the choke 188 and is passed to the oscilloscope 15 through the novel switch 190.

*Normal combustion pattern*

(Fig. 7)

Figure 7A:
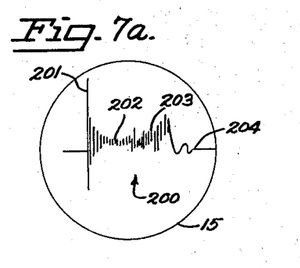
Fig. 7a representing an audio-frequency pattern, Fig. 7b a radio-frequency pattern, and Fig. 7c a composite of both patterns. All three oscillograms correspond to normal combustion in an engine cylinder.

Fig. 7 shows the kinds of diagrams that will appear on a typical oscilloscope 15 in my new engine analyzer during normal combustion. It will be noted that Fig. 7a shows the A-F pattern 200, obtained as by throwing the switch 44 across the terminals 120 and 121. This A-F pattern is also obtained by an analyzer like that shown in Patent 2,518,427.

The A-F normal combustion pattern 200 has been well authenticated and is clearly recognizable. At 201 the breaker points open, and spark discharge is initiated at the spark plugs 31 and 32, setting up audio-frequency oscillation signals 12. The fluctuating rate of change of current in the secondary circuit, reflected as a change of voltage in the primary circuit, appears on the oscilloscope 15. As the high energy discharges across the spark gap 31 to ground, the oscillation dies down and the pattern becomes attenuated at 202. Shortly thereafter the pattern bursts into life with a second stage of oscillations of increased amplitude at 203, apparently caused by an exceedingly rapid fluctuation of spark gap impedance appearing a short time after the spark is established (which we believe to be caused by turbulent motion of the cylinder gases at the spark plug). The exact mechanism of the impedance fluctuation is not known, and this theory itself may not be the true explanation, but the phenomenon does occur. This second stage of activity continues until the secondary energy is spent, and discharge then stops at 204. The activity apparently ceases when the rate of collapse of the magnetic field is no longer capable of producing the voltage necessary to maintain the arc at the plug gap, so that the arc is extinguished, and secondary flow ceases. The remaining energy is spent at the resonant frequency of the primary inductance 36 and capacitance 37.

Figure 7B:
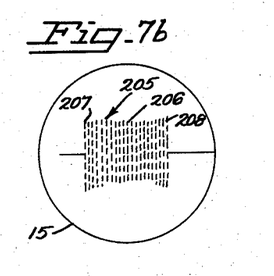

Fig. 7b shows the normal combustion pattern 205 for R-F oscillations. Note that there is ao continuous R-F supply and that the pattern 205 is normally slightly concave at 206 between maxima 207 and 208 though not always. This pattern 205 cannot be obtained in previous analyzers, but can be obtained here by throwing the switch 44 across the terminals 47 and 48 (Fig. 2).

My research has shown that the presence of absence of R-F oscillations in the circuit and their amplitude is greatly affected by the turbulance of the gas at the spark plug gap. Thus the pattern 205 can be obtained even when there is no combustion by blowing air at high velocity through the sparking gap. Tests have been made using a new spark plug in open air. When there was no air flow some R-F was produced but the signal was very faint and intermittent, probably because the initial spark discharge set up a strong initial pulse of R-F and immediately ionized the air across the spark plug gap. If there is nothing to move this ionized gas away, then there will be no more R-F. The intermittent presence of R-F was probably due to some slight flow of air at the gap, caused by Brownian movement or other factors which cannot be entirely eliminated. As the turbulence was increased, the R-F became less intermittent, and eventually a solid trace was registered. As the turbulence was increased still further, both the amplitude and the strength of the R-F oscillation were increased.

Thus the real reason for the shape of the R-F pattern 205 is not due so much to combustion as to the fact that during carburetion, induction, and combustion there is turbulence in the cylinder. One portion of the fuel-air mixture swirls past the spark plug and then beyond it, and a new portion of the fuel-air mixture swirls past the spark plug. This swirling occurs in normal combustion, and whenever something occurs that affects this turbulance, then it will affect the R-F pattern. Also, if there is no gap there will be no R-F, as will appear in the following section. Unlike the A-F pattern, the R-F pattern has few characteristic shapes and is normally indicated by either being on or off. Although it alone will not analyze as many conditions as A-F oscillations; still this on-off nature is of great advantage in the conditions that it does analyze, because it is much easier to read an on-off indication than it is to discriminate differences in pattern shape.

The presence or absence of combustion is, of course, indicated from the shape of A-F diagram; so it will be seen that in most instances it is desirable to have an A-F diagram as well as the R-F diagram.

Figure 7C:
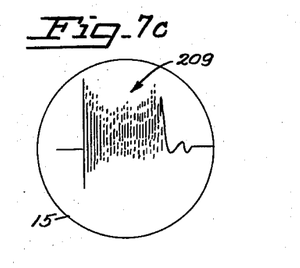

Fig. 7c shows how the composite A-F and R-F pattern 209 appears during normal combustion, when the switch 44 is thrown into contact with the terminals 100 and 101 (Fig. 2). This composite pattern 209 makes it possible to observe A-F and R-F simultaneously, while if the observer has doubt as to the conditions, he can by the selector switch examine either the A-F or R-F alone, for closer study.

*Analysis of low-resistance short in secondary:*
*(1) mechanical failure*

(Fig. 8)

Figure 8A:
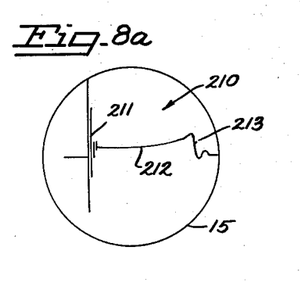
Fig. 8 shows three oscillograms similar to Fig. 7 but differing, due to the effect of a mechanical failure within the chamber, resulting in a shorted secondary pattern.

Fig. 8 shows how the present invention responds to a mechanical failure inside the engine cylinder 30 which has resulted in peening the spark plug 31 or 32 electrodes together. Since the spark plug contacts are peened together, there is a short circuit, but there is still A-F voltage, as shown by the pattern 210 in Fig. 8a. (Note that Fig. 8a is identical with Fig. 9a and very similar to Fig. 10a, which represent quite different conditions inside the cylinder 30.)

The pattern 210 is characterized by very rapid attenuation of audio-frequency oscillation at 211, low average vertical displacement, and long horizontal development at 212, followed by the hook region 213. Current theory accounts for this pattern by stating that the low resistance path to ground permits rapid decay of the oscillation at 211 and a high unilateral current flow, which builds up a large counter-E.M.F., slowing down the collapse of the magneto field and prolonging the discharge time over the region 212. The shorted path to ground also provides a constant secondary resistance, allowing current flow to stabilize. Hence, the small average vertical displacement of the analyzer trace, reflecting a low rate of change of secondary current.

Figure 8B:
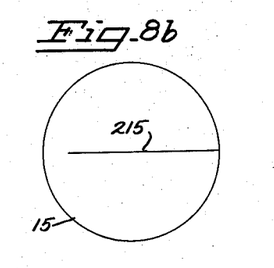
Figure 8C:
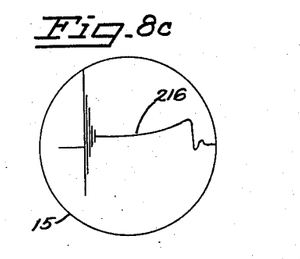

Fig. 8b, however, shows a pattern 215 which is simply a horizontal line, indicating substantially complete absence of R-F oscillations, and the composite pattern 216 of Fig. 8c therefore shows only the A-F oscillation and is identical to the pattern 210 of Fig. 8a. The absence of R-F oscillations in the pattern 215 is, of course, due to the fact that there is no spark plug gap; there is a pure short so that no R-F oscillations are even set up. Thus, a pure "off" condition is very easy to detect. The fact that it also indicates a very serious problem in the engine makes the R-F analyzer very advantageous. The presence of the A-F pattern 210 showing a low resistance short is also important, in that its indication eliminates confusion with other possible causes of the absence of R-F, such as the complete failure of the magneto.

In aircraft engines and in other engines where each cylinder has at least two spark plugs, the patterns from all spark plugs of any one cylinder may be superimposed at least some of the time on one diagram. This is possible because of the presence of the switch 43. A "double short"—the condition when both spark plugs (of a given cylinder in a twin-ignition system) are shorted—points to more serious trouble than would a single short, which could be due to a defective spark plug insulator or a grounded lead. Where the trouble occurs in only one spark plug in a cylinder, the trouble is not serious and can be remedied later on by replacing the defective plug or remedying the defective lead, but where *all* the spark plugs in any one cylinder show trouble of the type now being discussed and of the types discussed in the following sections, the trouble must be analyzed and action taken as soon as possible. The use of R-F oscillations makes such analysis possible. The superimposed diagrams look like the illustrated diagrams generally, though in some instances a difference in timing may produce a double image in the initial portion of the A-F diagram. The appearance of the R-F diagram remains the same.

*Analysis of low-resistance short in secondary: (2) leak from cylinder*

(Fig. 9)

Figure 9A:
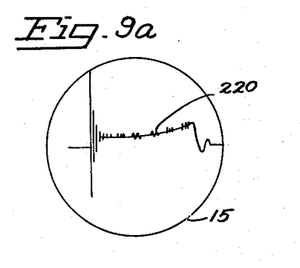
Fig. 9 shows three oscillograms similar to Fig. 8 and corresponding to the conditions where low compression is causing the shorted secondary pattern.

Fig. 9 shows the engine analyzer's indication of low compression within the cylinder 30, which may be caused by one of the valves 33 or 34 sticking in a partly opened position. Note that the A-F oscillation pattern 220 of Fig. 9a is substantially identical to the pattern 210 of Fig. 8a. This is true because the low pressure in the cylinder provides a low resistance short to ground across the gap. Without high pressure in the cylinder, the secondary current is grounded just as though there were no gap between the spark plug electrodes. In other words, so far as the A-F is concerned, the conditions are practically the same as where the spark plug has been peened over. This illustrates why previous analyzers were unable to distinguish between these two conditions.

Figure 9B:
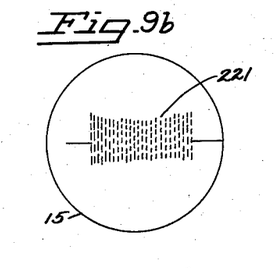

On the other hand, the pattern 221 of Fig. 9b is quite different from the pattern 215 of Fig. 8b. The R-F oscillation has somewhat lower amplitude than in the pattern 205 of Fig. 7b, but is continuously present in abundance. It is still continuous throughout the ignition cycle, because there is a continuous arc across the gaps of all the spark plugs 31 and 32 in the cylinder. This is true because of the fact that there is still turbulence in the air, and in fact there is exactly the same type of turbulence that there is during normal combustion; the amplitude of the turbulence may be somewhat reduced, but not significantly. The A-F pattern 220 thus indicates that the engine is not functioning normally while the R-F pattern shows conclusively that there is no mechanical failure. In other words, this very important differentiation between mechanical failure and the leaky valve are shown up immediately by observing both the R-F and A-F patterns. Contrasting the appearance of Figs. 8b and 9b while noting the similarity of Figs. 8a and 9a, it will instantly be seen that my new invention differentiates between mechanical failure and low compression, while the former types of analyzers, using only A-F oscillation, did not.

Figure 9C:
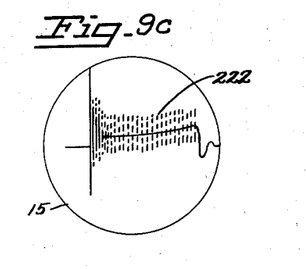

The composite pattern 222 of Fig. 9c, resulting as it does from the addition of patterns 220 and 221, is significantly different from the composite pattern 216, and so this composite pattern 222, by itself, can identify this difficulty.

Analysis of low resistance short in secondary:
(3) pre-ignition
(Fig. 10)

Figure 10A:
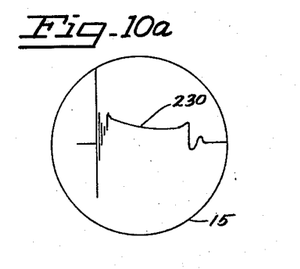
Fig. 10 shows three oscillograms similar to Fig. 8 and corresponding to the conditions where advanced pre-ignition is occurring.
Figure 10B:
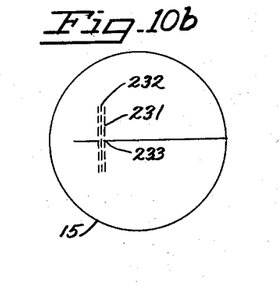
Figure 10C:
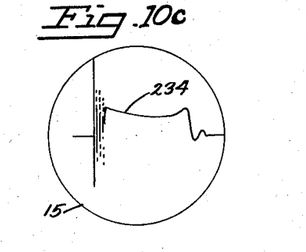

Fig. 10 shows the oscillograms caused by an advanced stage of pre-ignition. Note that the pattern 230 of Fig. 10a is similar to the patterns 210 and 220 of Figs. 8a and 9a (in the next stage of pre-ignition advancement the pattern becomes identical to 210), so that from A-F alone it would be difficult to tell which of the three conditions were present, though again, trouble is indicated. However, Fig. 10b shows an R-F pattern 231 with a brief pulse 232 quickly snuffed out at 233 in each cycle. Fig. 10c shows the composite pattern 234 which is the same as patterns 230 and 231 being added together and is different from the composite pattern previously shown.

In pre-ignition, the cylinder 30 is being fired by some hot spot on the surface of the combustion chamber and not by the spark plug 31 or 32. This hot spot starts a flame front in the combustion chamber prior to normal ignition at the spark plug. Normal ignition occurs at the spark plug (until pre-ignition becomes fully advanced) causing an initial pulse 232 of R-F current as the spark jumps the gap but as soon as the pre-ignition flame front progresses (by burning and combustion chamber gas turbulence and swirl) to and reaches the spark plug gap the highly ionized burning gases electrically short together the plug gaps, and further gas turbulence that may be in the combustion chamber is unable to affect the resultant pattern 231.

Pre-ignition is a condition which is progressive, and it can sometimes be observed and stopped before it becomes dangerous. If it is not observed until finally it becomes fully advanced, it will appear than *exactly* as in Fig. 8. There will be no R-F oscillation remaining, inasmuch as the pre-ignition flame front reaches the spark plug before a normal ignition can occur.

As pre-ignition advances, the cylinder-head temperature will increase. At cruising power levels, experience indicates that both the left and right plugs 31 and 32 can reach the fully shorted pattern and still have approximately a 50° cylinder head temperature rise before cylinder or piston damage results. Therefore, a limited time exists to take corrective action. Test data available indicates that at cruising and climb power levels, fully advanced pre-ignition may require 3 to 9 minutes or more to develop before it reaches a destructive point, depending upon the power and temperature level. At higher power and temperatures, it may develop more rapidly.

Therefore, unless the pilot is certain whether the adverse condition is pre-ignition or mechanical failure (i.e., when he catches the condition only after pre-ignition might be fully developed) he should first attempt to cool the cylinder by an injection of coolant or the other means mentioned earlier, and if that does not very soon produce an R-F pattern like that in Fig. 10 he should forthwith feather the propeller. If the pattern like Fig. 10 does develop, he can continue the corrective action and cure the pre-ignition difficulty.

Analysis of detonation
(Fig. 11)

Figure 11A:
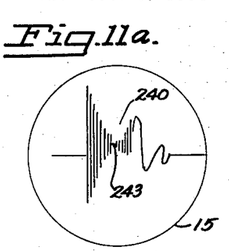
Fig. 11 shows three oscillograms similar to Fig. 8 and corresponding to the conditions where detonation is present.
Figure 11B:
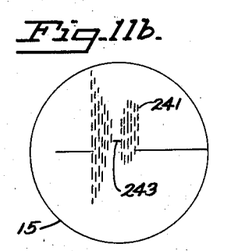
Figure 11C:
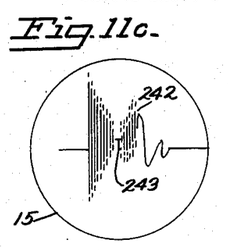

Detonation for an engine cylinder may result in pre-ignition, but it can be detected and the condition corrected before pre-ignition results. Fig. 11a shows the A-F pattern 240 which results from detonation, while Fig. 11b shows the R-F detonation pattern 241 and Fig. 11c shows the composite pattern 242.

Detonation occurs when ignition begins apparently in a normal manner and proceeds normally for a while, igniting successive portions of gas. Then, suddenly, all the gas remaining in a cylinder is exploded substantially simultaneously and instantaneously. Severe detonation reduces the power of the cylinder, may cause ring scuffing and combustion chamber surface erosion, increases combustion chamber temperature and may lead to pre-ignition. It will show up on the analyzer as a short gap or complete break 243 in oscillation in each of the three diagrams 240, 241 and 242. It will be noted that the composite diagram 242 is the easiest of all to read. The audio-frequency oscillogram 240 in some ways bears a resemblance to some other trouble patterns such as the one occurring when the distributor points bounce; there are differences in the patterns and detonation can be detected from the A-F pattern alone, but the R-F pattern makes it much easier to read and the interpretation is more positive. The break 243 in the R-F pattern 241 is caused, so present theory states, by the fact that the gas is then being burned (exploded) directly at the spark plug gap. This is not normal in an engine; usually, the spark heats a first portion of the swirling fuel-air mixture, and the burning occurs a fraction of a second later after the heated mixture has moved away from the spark plug, and a new portion is present there. But when detonation ignites all the unignited gas in the cylinder, gas is ignited right at the spark in the gap. The resultant ionization brings about a complete breakdown of resistance—a momentary short for a fraction of time that is clearly observable on the scope.

Following this brief moment the normal burned gas resistance resumes and the normal type A-F and R-F diagram resumes. This explosive burning of all of the end gases results in much greater turbulence in the cylinder gases; therefore, the end part of the diagram after detonation is higher and even more dynamic than normal.

Figure 12:
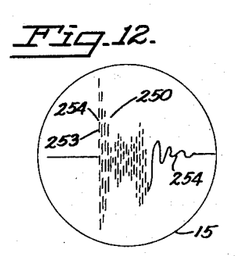
Fig. 12 shows a composite A-F, R-F oscillogram showing the conditions of normal engine operation where the combustion mixture is too lean.
Figure 13:
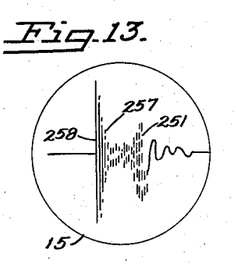
Fig. 13 shows an oscillogram similar to Fig. 12 but where the combustion mixture is ideal.
Figure 14:
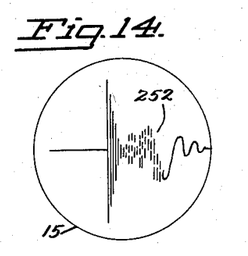
Fig. 14 shows an oscillogram similar to Fig. 12 but where the combustion mixture is too rich.

Effect of changing fuel-air mixture
(Figs. 12–14)

The R-F, A-F composite diagram may be used in getting an approximation of the fuel-air mixture being ignited in the cylinder. Most airplanes have other instruments for obtaining these data. One very accurate way is to plot a mixture hook curve, by plotting torque specific fuel consumption against B.M.E.P., as read on a torquemeter. However, these computations and curves take time, while by calibrating the scope for a particular type of engine, it is possible to obtain instantaneously a significant picture of the fuel-air mixture.

In Fig. 12 a composite oscillogram 250 indicating a lean mixture is shown; Fig. 13 shows a maximum power mixture oscillogram 251; and Fig. 14 shows a mixture 252 that is too rich. It will be noted that in the lean mixture pattern 250 the R-F 253 and A-F 254 start simultaneously, because there is plenty of turbulence. In the too rich mixture 252, the flame speed has been reduced, and therefore, the turbulence which causes R-F, has been delayed. As Fig. 13 shows, the ideal power mixture, at least for some engines, appears when the R-F curve 257 appears almost directly after the A-F curve 258 appears, but not exactly simultaneously with it.

It will be noted that leaning the mixture moves the initial pulse of the R-F curve to the left and enriching it moves it to the right. The initial pulse of the R-F curve is the important thing, for the end of the curve is almost always at the same place unless some abnormal condition is present in the engine.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In an engine analyzer, the combination with an engine ignition circuit and cathode-ray oscilloscope having a horizontal sweep circuit and vertical deflection means, of a radio frequency enhancing means for increasing the strength of radio-frequency oscillating current relative to the strength of audio-frequency oscillating current, connecting said engine ignition circuit with said vertical deflection means of said oscilloscope.

2. In an engine analyzer for internal combustion engines having an ignition circuit, the combination therewith of an electric signal pick-up means connected to said circuit, an instantaneous-image cathode-ray oscilloscope, and a radio frequency amplifier means for amplifying the strength of the radio-frequency components of said signal relative to the strength of other frequencies connecting said pick-up means and said oscilloscope.

3. The analyzer of claim 2 in which there is a R-F passing and A-F blocking condenser between said ignition circuit and said radio frequency amplifier.

4. In an engine analyzer for internal combustion engines: an ignition circuit including a spark plug, a distributor, and a magneto in series, said magneto having a primary and a secondary coil, a primary condenser in parallel with said primary coil, and breaker points in parallel with said primary coil and said condenser, all three of said parallel elements being grounded; a second condenser in series with said ignition circuit, an R-F amplifier means for increasing the strength of radio-frequency currents relative to the strength of lower-frequency currents, in series therewith; and a cathode-ray oscilloscope having vertical deflection plates in series with said amplifier and a horizontal sweep circuit.

5. In an engine analyzer for internal combustion engines: an ignition circuit including a spark plug, a distributor, and a magneto in series, said magneto having a primary and a secondary coil, a primary condenser in parallel with said primary coil, and breaker points in parallel with said primary coil and said condenser, all three of said parallel elements being grounded; a radio-frequency amplifier in series with said ignition circuit; and an oscilloscope with one set of plates in series with said amplifier and a second set provided with a sweep circuit; a switch for connecting said oscilloscope directly to said ignition circuit and, alternately, indirectly to said ignition circuit through said amplifier.

6. The analyzer of claim 5 in which said switch can in a third position connect said oscilloscope simultaneously to said ignition circuit both directly and through said amplifier.

7. The analyzer of claim 6 in which there is a R-F choke coil between the line connecting said oscilloscope to said ignition circuit directly and the line connecting said oscilloscope to said amplifier.

8. In an engine analyzer, the combination with the engine ignition circuit, and cathode-ray oscilloscope, of a radio frequency amplifier for amplifying radio-frequency currents relative to lower-frequency currents connecting said circuit to said oscilloscope.

9. In an engine analyzer, the combination with an engine ignition circuit and a cathode-ray oscilloscope having first coordinate deflection means governed by a sweep circuit and second coordinate deflection means, of a radio frequency enhancing means for increasing the relative strength of radio-frequency signals, connecting said circuit with said second deflection means of said oscilloscope.

10. In an engine analyzer for internal combustion engines: an ignition circuit including a spark plug, a distributor, and a magneto in series, said magneto having a primary and a secondary coil, a primary condenser in parallel with said primary coil, and breaker points in parallel with said primary coil and said condenser, all three of said parallel elements being grounded; a radio-frequency low-resistance choke coil in series with said primary condenser; a second condenser in series with said ignition circuit; and an oscilloscope with one set of plates in series with said ignition circuit and a second set of plates provided with a sweep circuit.

11. In an engine analyzer for internal combustion engines: an ignition circuit including a spark plug, a distributor, and a magneto in series, said magneto having a primary and a secondary coil, a primary condenser in parallel with said primary coil, and connector points in parallel with said primary coil and said condenser, all three of said parallel elements being grounded; a bypass condenser and lead running from the spark plug side of said distributor and connected to the primary side of said ignition circuit through a radio-frequency choke coil; and an oscilloscope with one set of plates in series with said ignition circuit and a second set of plates provided with a sweep circuit.

12. In an engine analyzer for internal combustion engines: an ignition circuit including a spark plug, and a magneto in series, said magneto having a grounded primary coil, a secondary coil, and a grounded primary condenser in parallel with said primary coil; a bypass condenser and lead running from the spark plug side of said magneto and connected to the primary side thereof through a radio-frequency choke coil; and an oscilloscope with one set of plates in series with said ignition circuit and a second set of plates provided with a sweep circuit.

13. In an engine analyzer for internal combustion engines having an ignition circuit, the combination therewith of an electric signal pickup means connected to said circuit, an oscilloscope, a radio-frequency amplifier connecting said pickup means and said oscilloscope, and a three-way switch for connecting said radio-frequency amplifier between said oscilloscope and said pickup means, for connecting said oscilloscope directly to said pickup means, and for connecting said oscilloscope and said pickup means both directly and through said amplifier.

14. The analyzer of claim 13 in which there is a R-F choke coil between said amplifier and the direct connection when the switch is in the third-named position.

15. In an engine analyzer for internal combustion engines: an ignition circuit including a spark plug, a distributor, and a magneto in series, said magneto having a primary and a secondary coil, a primary condenser in parallel with said primary coil, and breaker points in parallel with said primary coil and said condenser, all three of said parallel elements being grounded; a second condenser in series with said ignition circuit; a radio-frequency amplifier in series with said second condenser; and an oscilloscope with one set of plates in series with said amplifier and a second set provided with a sweep circuit; a switch for connecting said oscilloscope directly to said second condenser and, alternately, indirectly to said second condenser through said amplifier, and also, alternately, both directly to said second condenser and indirectly to said second condenser through said amplifier simultaneously.

16. The analyzer of claim 15 in which there is a R-F choke coil between the line connecting said oscilloscope to said condenser directly and the line connecting said oscilloscope to said amplifier.

17. In a performance analyzer for an engine, the combination including an engine ignition circuit, audio-frequency and radio-frequency signal pickup means connected to said ignition circuit, a cathode-ray tube, first coordinate and second coordinate deflection means for the electron beam in said tube, means to impress, alternately, audio-frequency, and radio-frequency signals from the signal pickup means on one of said deflection means, and a sweep voltage generating device to impress deflecting voltages on the other of said deflection means.

18. In an engine-performance analyzer, an engine ignition circuit; audio-frequency and radio-frequency signal pickup means connected to said circuit, a cathode-ray tube, first coordinate and second coordinate deflection means for the electron beam in said tube, means to impress, both alternately and simultaneously, audio-frequency and radio-frequency signals from the signal pickup means on one of said deflection means, and a sweep voltage generating device to impress deflecting voltages on the other of said deflection means.

19. In an engine analyzer, the combination with an engine ignition circuit and cathode-ray oscilloscope having first coordinate deflection means governed by a sweep circuit and second coordinate deflection means, of radio-frequency enhancing means and audio-frequency suppressing means connecting said circuit with said second deflection means of said oscilloscope.

20. In an engine-performance analyzer, an engine ignition circuit, audio-frequency and radio-frequency signal pickup means connected to said circuit, a cathode-ray tube, first and second coordinate deflection means for the electron beam in said tube, means to impress only said radio-frequency signal from the signal pickup means on one of said deflection means, and a sweep voltage generating device to impress deflecting voltages on the other of said deflection means.

21. An ignition system analyzer for an internal combustion engine having an ignition circuit with primary and secondary circuits, said analyzer including in combination a cathode-ray tube, vertical and horizontal deflection means for the electron beam in said tube, means to impress radio-frequency signals from at least one spark plug of the engine on one said deflection means, said means to impress comprising a radio-frequency amplifier for increasing the strength of said radio-frequency signals relative to the strength of lower-frequency signals, connecting said primary circuit to one said deflection means, and a sweep voltage generating device to impress deflecting voltages on the other said deflection means.

22. An ignition system analyzer for an internal combustion engine having an ignition circuit with primary and secondary circuits, said primary circuit including a grounded condenser, said analyzer including a cathode-ray tube, vertical and horizontal deflection means for the electrton beam in said tube, means to impress radio-frequency signals from at least one spark plug of the engine on one said deflection means, said means to impress radio-frequency signals comprising a low-resistance radio-frequency choke coil in series with said primary condenser, and a sweep voltage generating device to impress deflecting voltages on the other said deflection means.

23. An ignition system analyzer for an internal combustion engine having an ignition circuit with a primary circuit and a secondary circuit, said secondary circuit including a spark plug, said analyzer including a cathode ray tube, vertical and horizontal deflection means for the electron beam in said tube, means to impress radio-frequency signals from said spark plug on said deflection means and comprising a by-pass condenser connected in said secondary circuit and joined to said primary circuit by radio-frequency choking inductance, and a sweep voltage generating device to impress deflecting voltages on the other said deflection means.

24. An ignition system analyzer for an internal combustion engine having a high-frequency ignition circuit including a magneto with primary and secondary coils, a distributor with breaker points and spark plugs with a high voltage transformer closely adjacent the gaps, said analyzer including a cathode-ray tube, vertical and horizontal deflection means for the electron beam in said tube, means to impress radio-frequency signals from at least one spark plug of the engine on one said deflection means and comprising a low-inductance coupling to the distributor breaker points, a condenser in series therewith, and a radio-frequency choke means interposed between said condenser and said primary and secondary coils, and a sweep voltage generating device to impress deflecting voltages on the other said deflection means.

References Cited in the file of this patent

UNITED STATES PATENTS

| | | |
|---|---|---|
| 2,335,780 | McCoy | Nov. 30, 1943 |
| 2,355,363 | Christaldi | Aug. 8, 1944 |
| 2,381,609 | McCoy | Aug. 7, 1945 |
| 2,499,410 | Nupp | Mar. 7, 1950 |
| 2,518,427 | Lindberg | Aug. 8, 1950 |
| 2,704,807 | Wallace | Mar. 22, 1955 |
| 2,787,760 | Sammis | Apr. 2, 1957 |

OTHER REFERENCES

Publication—"Westinghouse Engineer," volume 4, November 1944, the article beginning on page 169 and describing an electronic oscillograph by Ackermann and Beck.

"Electrical Measurements on Aircraft Ignition Circuits," AIEE Technical Paper 46–14, by Wm. E. Berkey, December 1945.